(12) United States Patent
Peng

(10) Patent No.: US 11,089,276 B2
(45) Date of Patent: Aug. 10, 2021

(54) PROJECTION DEVICE

(71) Applicant: Coretronic Corporation, Hsin-Chu (TW)

(72) Inventor: Ken-Teng Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 21 days.

(21) Appl. No.: 16/698,968

(22) Filed: Nov. 28, 2019

(65) Prior Publication Data

US 2020/0177853 A1    Jun. 4, 2020

(30) Foreign Application Priority Data

Dec. 3, 2018   (CN) .......................... 201822008234.7

(51) Int. Cl.
*H04N 9/31* (2006.01)
(52) U.S. Cl.
CPC ......... *H04N 9/3167* (2013.01); *H04N 9/3197* (2013.01)
(58) Field of Classification Search
None
See application file for complete search history.

(56) References Cited

U.S. PATENT DOCUMENTS

2004/0263795 A1 * 12/2004 Manabe ................. G03B 21/26
353/34

FOREIGN PATENT DOCUMENTS

TW          200916828         4/2009

* cited by examiner

*Primary Examiner* — Samira Monshi
(74) *Attorney, Agent, or Firm* — JCIPRNET

(57) ABSTRACT

A projection device including an illumination system, a polarization beam splitting component, a first light valve, a second light valve, and a projection lens is provided. The polarization beam splitting component is disposed on a transmission path of the beams of multiple colors that are transmitted from the illumination system in time sequence. The polarization beam splitting component splits each color beam into a first polarization beam and a second polarization beam having polarization states perpendicular to each other. The first light valve is disposed on a transmission path of the first polarization beam and converts the first polarization beam into a first image beam. The second light valve is disposed on a transmission path of the second polarization beam and converts the second polarization beam into a second image beam. The projection lens is disposed on transmission paths of the first image beam and the second image beam.

11 Claims, 11 Drawing Sheets

PROJECTION DEVICE

CROSS-REFERENCE TO RELATED APPLICATION

This application claims the priority benefit of China application serial no. 201822008234.7, filed on Dec. 3, 2018. The entirety of the above-mentioned patent application is hereby incorporated by reference herein and made a part of this specification.

BACKGROUND OF THE INVENTION

Field of the Invention

The invention relates to an electronic device, and in particular, to a projection device.

Description of Related Art

According to different requirements, a projection device may be provided with one, two, or three light valves. In the current projection device that uses two light valves, two color beams (e.g., a blue beam and a red beam) among illumination beams (e.g., a blue beam, a green beam, and a red beam) are converted into an image beam by one of the two light valves (referred to as a first light valve), and the remaining color beam (e.g., the green beam) is converted into an image beam by the other of the two light valves (referred to as a second light valve). In such a framework, the brightness of the blue image beam and the red image beam is confined by the upper limit of the tolerance brightness of the first light valve, and the brightness of the green image beam is confined by the upper limit of the tolerance brightness of the second light valve. In addition, in order to mix white light, the red image beam, the green image beam, and the blue image beam are required to satisfy a certain color distribution ratio. Therefore, the brightness of the image beam output by the current projection device using two light valves cannot be effectively improved.

The information disclosed in this "BACKGROUND OF THE INVENTION" section is only for enhancement of understanding of the background of the described technology and therefore it may contain information that does not form the prior art that is already known to a person of ordinary skill in the art. The information disclosed in this "BACKGROUND OF THE INVENTION" section does not represent the problems to be resolved by one or more embodiments of the present invention, and it also does not mean that the information is acknowledged by a person of ordinary skill in the art before the application of the present invention.

SUMMARY OF THE INVENTION

The invention provides a projection device in which the output image beam exhibits an ideal brightness.

Other objects and advantages of the invention can be further illustrated by the technical features broadly embodied and described as follows.

In order to achieve one or a portion of or all of the objects or other objects, an embodiment of the invention provides a projection device including an illumination system, a polarization beam splitting component, a first light valve, a second light valve, and a projection lens. The illumination system outputs beams of multiple colors in time sequence. The polarization beam splitting component is disposed on a transmission path of the beams of multiple colors transmitted from the illumination system. The polarization beam splitting component splits each color beam among the beams of multiple colors into a first polarization beam and a second polarization beam, and the first polarization beam and the second polarization beam have polarization states perpendicular to each other. The first light valve is disposed on a transmission path of the first polarization beam and converts the first polarization beam into a first image beam. The second light valve is disposed on a transmission path of the second polarization beam and converts the second polarization beam into a second image beam. The projection lens is disposed on transmission paths of the first image beam and the second image beam.

In light of the above, the embodiments of the invention exhibit at least one of the following advantages or effects. In the embodiments of the invention, the polarization beam splitting component is used to split each color beam among the beams of multiple colors into two illumination beams having polarization states perpendicular to each other, such that the illumination beams received by two light valves in the same time segment have the same color. In addition, the two illumination beams having the same color are respectively converted into image beams having the same color by the two light valves, and the image beams having the same color are then transmitted to the projection lens and output from the projection device. Therefore, the brightness of the image beam of each color output from the projection device is not confined by the upper limit of the tolerance brightness of one single light valve, and the projection device can exhibit an ideal brightness.

Other objectives, features and advantages of the present invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
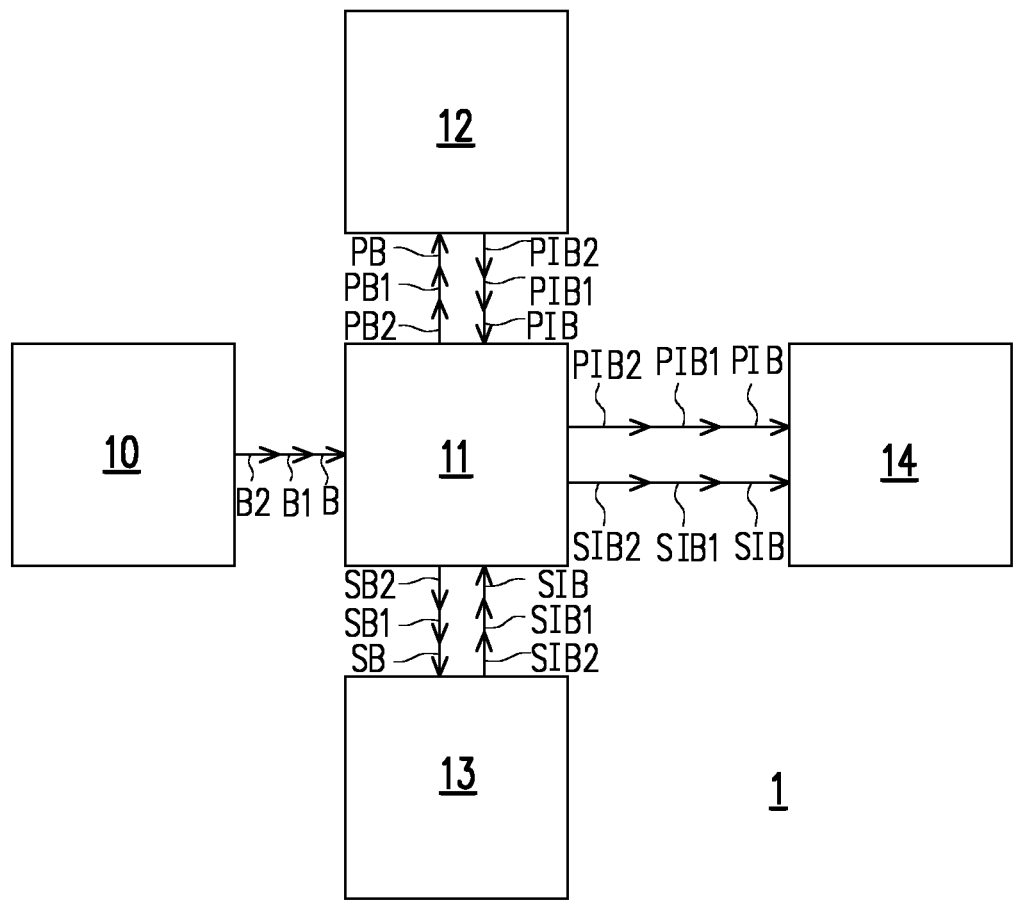
FIG. 1 is a schematic view of an embodiment of a projection device of the invention.

FIG. 1 is a schematic view of an embodiment of a projection device of the invention. Referring to FIG. 1, a projection device 1 includes an illumination system 10, a polarization beam splitting component 11, a first light valve 12, a second light valve 13, and a projection lens 14.

The illumination system 10 outputs beams of multiple colors in time sequence. In other words, the beams of multiple colors are respectively output from the illumination system 10 in different time segments, and the illumination system 10 only outputs the beam of one color in each time segment. FIG. 1 shows that the illumination system 10 outputs an excitation beam B (e.g., a blue beam), a green beam B1, and a red beam B2 in time sequence. However, the types of colors and the number of colors of the beams output from the illumination system 10 and the output sequence of the color beams are not limited to those shown in FIG. 1.

The polarization beam splitting component 11 is disposed on a transmission path of the beams of multiple colors transmitted from the illumination system 10. In the embodiment, the beams of multiple colors output from the illumination system 10 are transmitted to the polarization beam splitting component 11 via the same transmission path. In addition, the polarization beam splitting component 11 splits each color beam among the beams of multiple colors into a first polarization beam and a second polarization beam, and the first polarization beam and the second polarization beam have polarization states perpendicular to each other. For example, in a first time segment, the polarization beam splitting component 11 splits the excitation beam B (e.g., a blue beam) into a first polarization beam PB and a second polarization beam SB, and the first polarization beam PB and the second polarization beam SB respectively have a P-polarization state and an S-polarization state. In a second time segment, the polarization beam splitting component 11 splits the green beam B1 into a first polarization beam PB1 and a second polarization beam SB1, and the first polarization beam PB1 and the second polarization beam SB1 respectively have a P-polarization state and an S-polarization state. In a third time segment, the polarization beam splitting component 11 splits the red beam B2 into a first polarization beam PB2 and a second polarization beam SB2, and the first polarization beam PB2 and the second polarization beam SB2 respectively have a P-polarization state and an S-polarization state.

The first light valve 12 is disposed on a transmission path of the first polarization beam (e.g., the first polarization beam PB, the first polarization beam PB1, and the first polarization beam PB2) and converts the first polarization beam into a first image beam. For example, in the first time segment to the third time segment, the first light valve 12 converts the first polarization beam PB, the first polarization beam PB1, and the first polarization beam PB2 into a first image beam PIB, a first image beam PIB1, and a first image beam PIB2, respectively. The first light valve 12 may be a digital micro-mirror device (DMD), a liquid-crystal-on-silicon panel (LCOS panel), or a transmissive liquid crystal panel, but the invention is not limited thereto.

The second light valve 13 is disposed on a transmission path of the second polarization beam (e.g., the second polarization beam SB, the second polarization beam SB1, and the second polarization beam SB2) and converts the second polarization beam into a second image beam. For example, in the first time segment to the third time segment, the second light valve 13 converts the second polarization beam SB, the second polarization beam SB1, and the second polarization beam SB2 into a second image beam SIB, a second image beam SIB1, and a second image beam SIB2, respectively. The second light valve 13 may be a digital micro-mirror device, a liquid-crystal-on-silicon panel, or a transmissive liquid crystal panel, but the invention is not limited thereto.

In the embodiment, the polarization beam splitting component 11 is also disposed on transmission paths of the first image beam (e.g., the first image beam PIB, the first image beam PIB1, and the first image beam PIB2) transmitted from the first light valve 12 and the second image beam (e.g., the second image beam SIB, the second image beam SIB1, and the second image beam SIB2) transmitted from the second light valve 13. The first image beam and the second image beam are combined together by the polarization beam splitting component 11, and the first image beam and the second image beam which are combined are transmitted to the projection lens 14 via the polarization beam splitting component 11, but the invention is not limited thereto. In another embodiment, the projection device 1 may additionally include a polarization beam combining component and/or a light transmission component to transmit the first image beam and the second image beam to the projection lens 14.

The projection lens 14 is disposed on transmission paths of the first image beam and the second image beam. The projection lens 14 may be an existing projection lens and shall not be repeatedly described here.

Figure 2A:
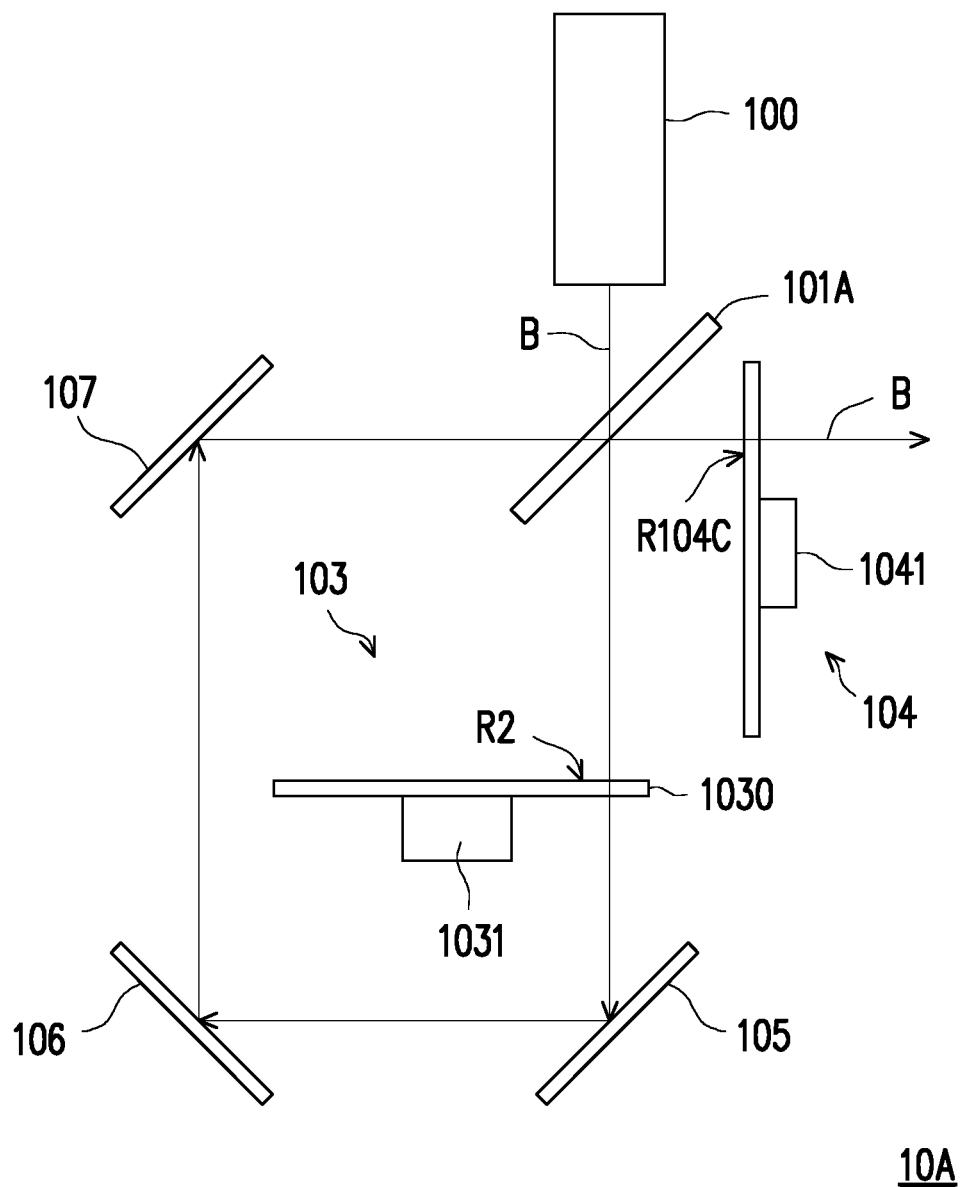
FIG. 2A to FIG. 2C are respectively schematic views of an embodiment of the illumination system in FIG. 1 in different time segments.
Figure 2B:
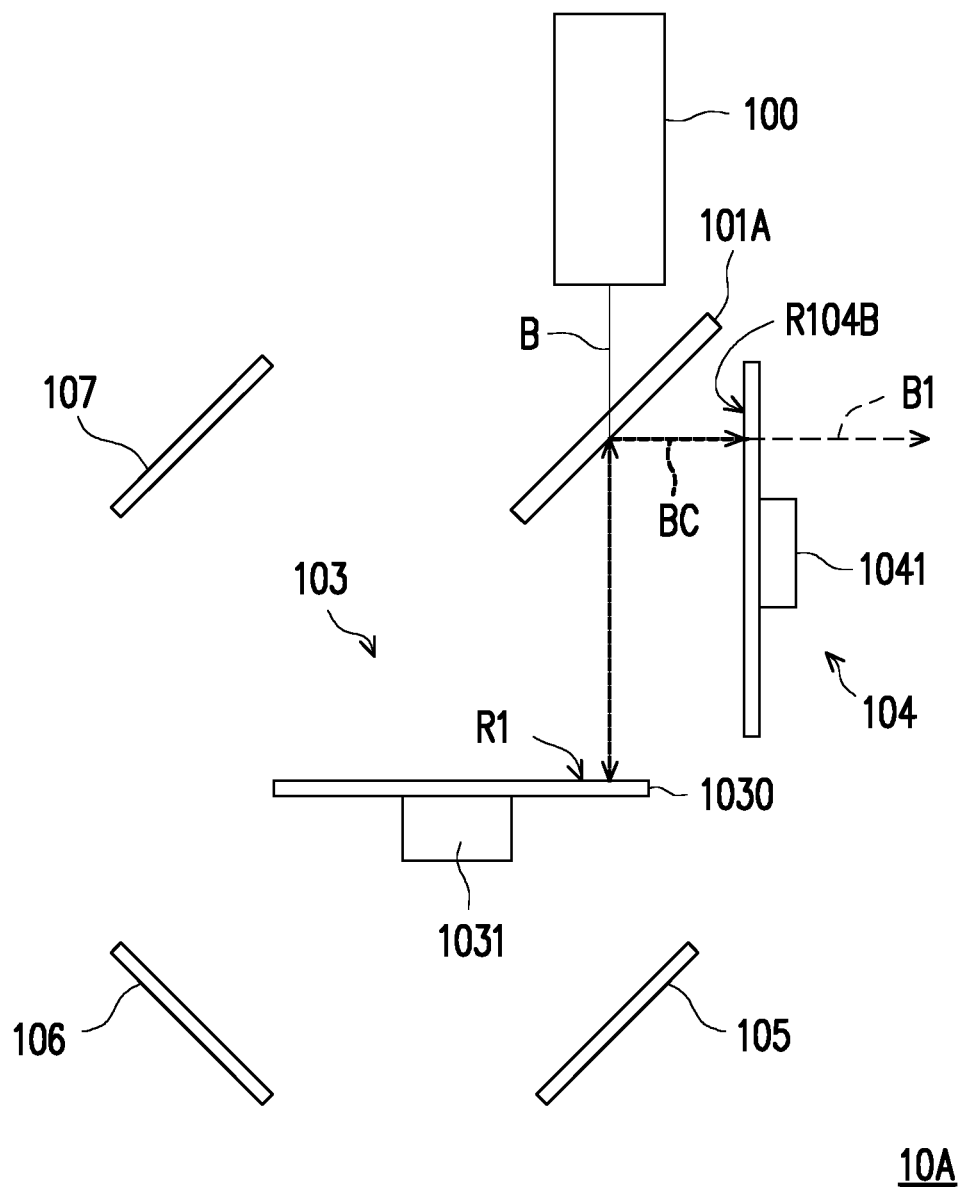
Figure 2C:
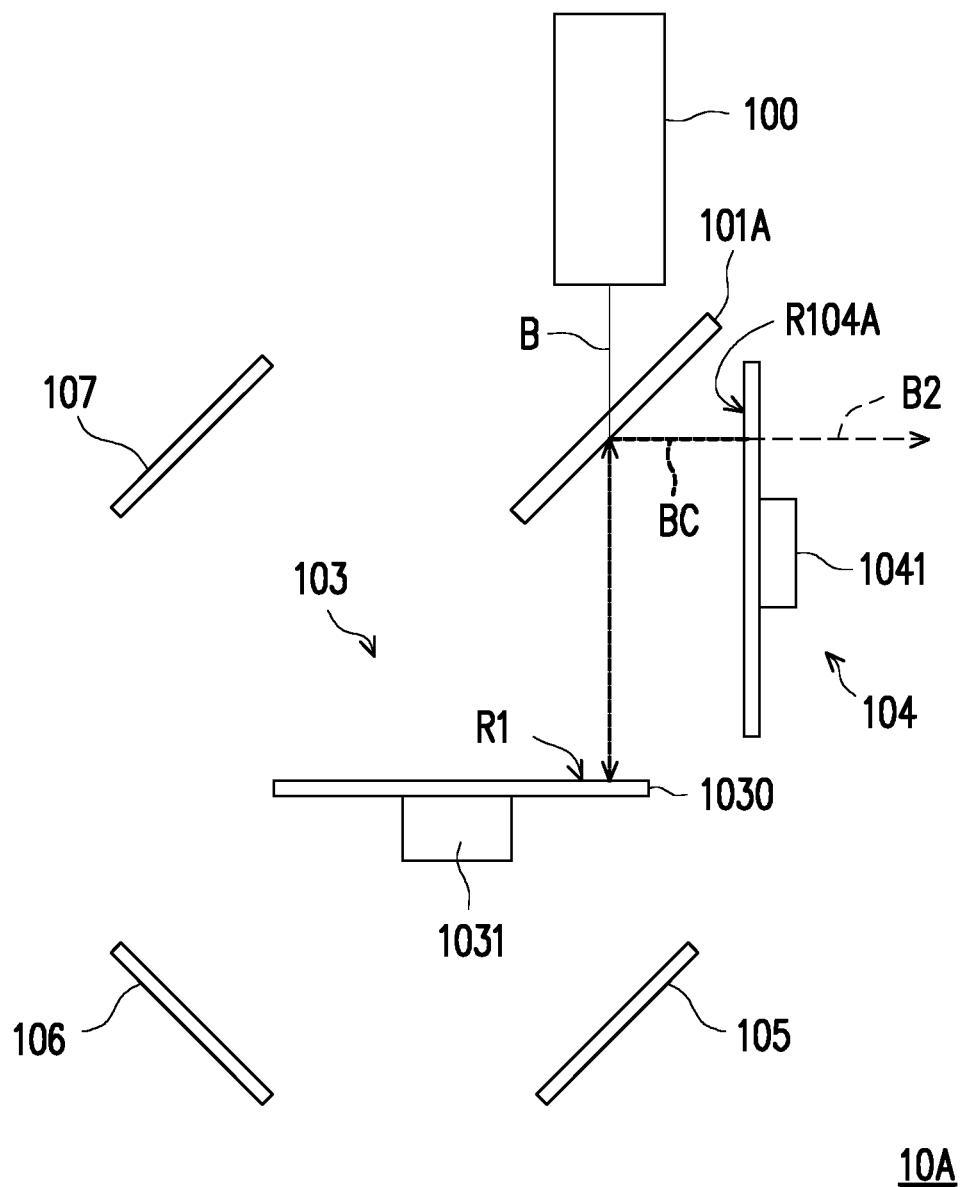

FIG. 2A to FIG. 2C are respectively schematic views of an embodiment of the illumination system 10 in FIG. 1 in different time segments. Referring to FIG. 2A to FIG. 2C, an illumination system 10A includes an excitation light source 100, a beam combining component 101A, a wavelength conversion module 103, and a light filtering module 104.

The excitation light source 100 outputs an excitation beam B. For example, the excitation light source 100 may include a plurality of light emitting components. The plurality of light emitting components may be a plurality of light emitting diodes, a plurality of laser diodes, or a combination of the above two types of light emitting components. The excitation beam B is, for example, a blue beam, but the invention is not limited thereto.

The beam combining component 101A is disposed on a transmission path of the excitation beam B transmitted from the excitation light source 100. In the embodiment, the beam combining component 101A allows the excitation beam B to pass through, but the invention is not limited thereto. In another embodiment, the beam combining component 101A may reflect the excitation beam B.

The wavelength conversion module 103 is disposed on a transmission path of the excitation beam B transmitted from the beam combining component 101A, and the wavelength conversion module 103 has a light conversion region R1 and a non-light conversion region R2. The light conversion region R1 and the non-light conversion region R2 alternately cut into the transmission path of the excitation beam B transmitted from the beam combining component 101A, and the light conversion region R1 is adapted to convert the excitation beam B into a conversion beam BC.

Figure 3:
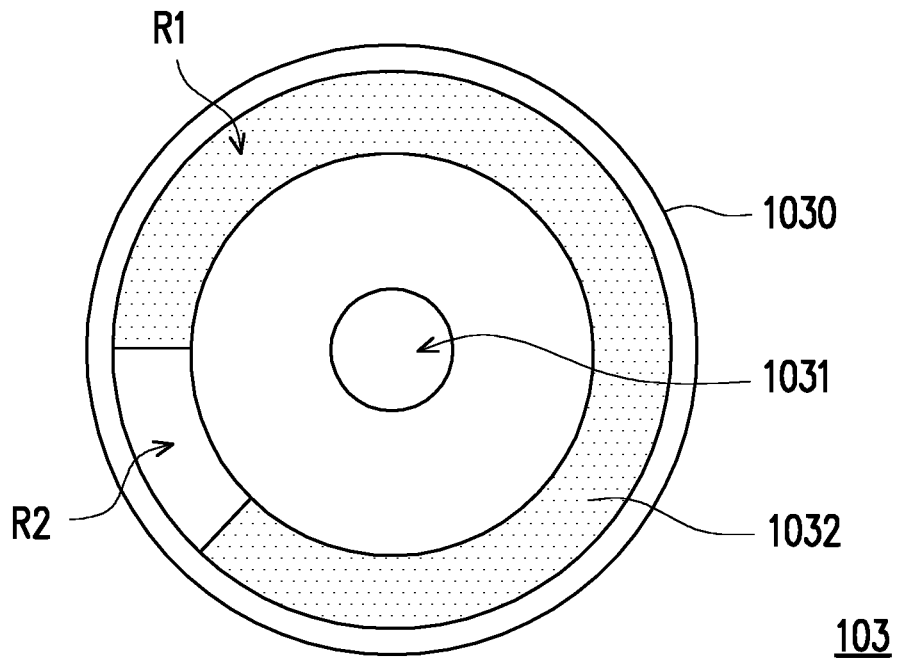
FIG. 3 is a front view of the wavelength conversion module in FIG. 2A to FIG. 2C.

FIG. 3 is a front view of the wavelength conversion module 103 in FIG. 2A to FIG. 2C. Referring to FIG. 3 and FIG. 2A to FIG. 2C, the wavelength conversion module 103 may include a carrier board 1030, a rotation axis 1031, and a wavelength conversion layer 1032 (not shown in FIG. 2A to FIG. 2C; referring to FIG. 3). The rotation axis 1031 is located at the center of the carrier board 1030. The light conversion region R1 and the non-light conversion region R2 are arranged around the rotation axis 1031 along a circumferential direction of the carrier board 1030. The wavelength conversion module 103 is adapted to rotate with the rotation axis 1031 as the central axis such that the light conversion region R1 and the non-light conversion region R2 alternately cut into the transmission path of the excitation beam B transmitted from the beam combining component 101A.

The wavelength conversion layer 1032 is disposed on the carrier board 1030 and located in a region outside the non-light conversion region R2. In other words, the wavelength conversion layer 1032 is not located in the non-light conversion region R2, and the non-light conversion region R2 is not covered by the wavelength conversion layer 1032. As shown in FIG. 3, the wavelength conversion layer 1032 is disposed in the annular light conversion region R1. However, the shape and/or the arrangement of the wavelength conversion layer 1032 is not limited to that shown in FIG. 3.

The wavelength conversion layer 1032 is adapted to convert the excitation beam B into a conversion beam (e.g., the conversion beam BC shown in FIG. 2B and FIG. 2C). For example, the material of the wavelength conversion layer 1032 may include a phosphor powder, a quantum dot, or a combination of the above two types of light conversion materials. In the embodiment, the conversion beam BC is a yellow beam. Moreover, the numbers of the light conversion region R1 and the non-light conversion region R2 are respectively one. The light conversion region R1 cuts into the transmission path of the excitation beam B transmitted from the beam combining component 101A in the second time segment as shown in FIG. 2B and the third time segment as shown in FIG. 2C, and the non-light conversion region R2 cuts into the transmission path of the excitation beam B transmitted from the beam combining component 101A in the first time segment as shown in FIG. 2A. However, the color of the conversion beam BC, the number of the light conversion region R1, and the number of the non-light conversion region R2 may be changed according to the requirement and are not limited to those shown in FIG. 3. In another embodiment, the wavelength conversion module 103 may have two light conversion regions, e.g., a first conversion region for converting the excitation beam B into a green beam and a second conversion region for converting the excitation beam B into a red beam, and the first conversion region and the second conversion region are respectively provided with a green wavelength conversion layer and a red wavelength conversion layer.

Referring to FIG. 2A to FIG. 2C, in the embodiment, the non-light conversion region R2 allows the excitation beam B to pass through (as shown in FIG. 2A), and the light conversion region R1 converts the excitation beam B into the conversion beam BC and then reflects the conversion beam BC (as shown in FIG. 2B and FIG. 2C). In such a framework, the carrier board 1030 may be a metal carrier board, and an opening is formed in the non-light conversion region R2 of the metal carrier board to allow the excitation beam B to pass through. Alternatively, the carrier board 1030 may be a light transmissive carrier board having a reflective layer formed thereon, and the reflective layer is located in a region outside the non-light conversion region R2 such that the excitation beam B passes through the non-light conversion region R2, and the conversion beam BC is reflected by the light conversion region R1. The illumination system 10A may further include a plurality of reflection components (e.g., a reflection component 105, a reflection component 106, and a reflection component 107). As shown in FIG. 2A, the plurality of reflection components are disposed on the transmission path of the excitation beam B passing through the non-light conversion region R2 and transmit the excitation beam B passing through the non-light conversion region R2 back to the beam combining component 101A.

The beam combining component 101A is also disposed on transmission paths of the conversion beam BC and the excitation beam B transmitted from the wavelength conversion module 103. In the embodiment, the beam combining component 101A reflects the conversion beam BC, but the invention is not limited thereto. In another embodiment, the beam combining component 101A may reflect the excitation beam B and allow the conversion beam BC to pass through.

Figure 4:
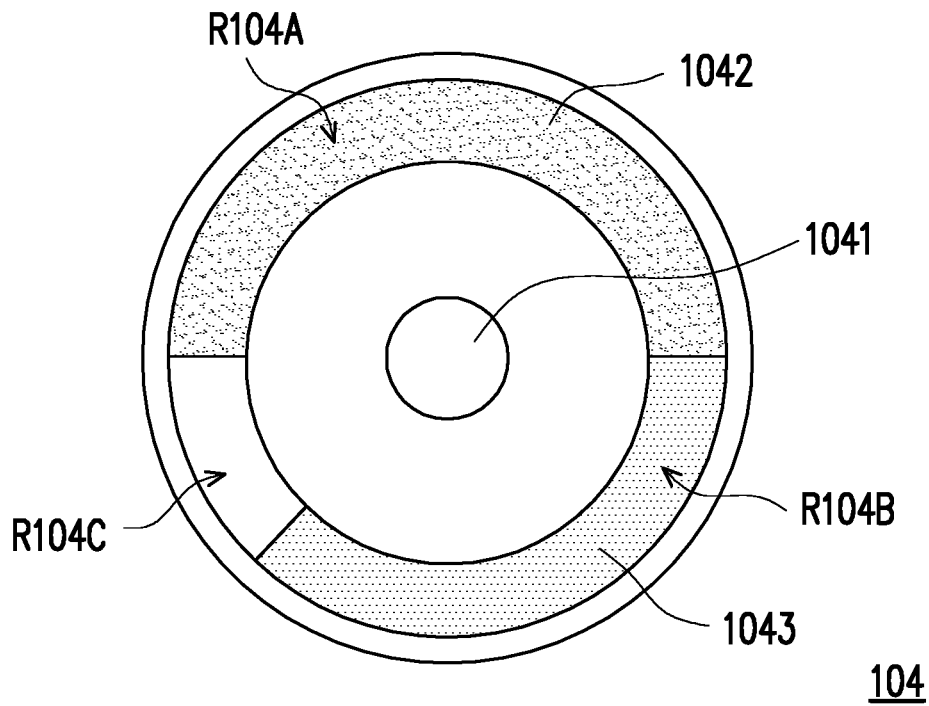
FIG. 4 is a front view of the light filtering module in FIG. 2A to FIG. 2C.

The light filtering module 104 is disposed on transmission paths of the conversion beam BC and the excitation beam B transmitted from the beam combining component 101A. FIG. 4 is a front view of the light filtering module 104 in FIG. 2A to FIG. 2C. Referring to FIG. 4, the light filtering module 104 may have a first light filtering region R104A, a second light filtering region R104B, and a third light filtering region R104C. The first light filtering region R104A, the second light filtering region R104B, and the third light filtering region R104C are arranged around a rotation axis 1041 along a circumferential direction of the light filtering module 104. The first light filtering region R104A and the second light filtering region R104B are disposed corresponding to the light conversion region R1 of the wavelength conversion module 103, and the third light filtering region R104C is disposed corresponding to the non-light conversion region R2 of the wavelength conversion module 103. In the embodiment, the first light filtering region R104A is provided with a red filter 1042 which allows the red beam B2 (referring to FIG. 2C) to pass through and filters out beams of the remaining color, and the second light filtering region R104B is provided with a green filter 1043 which allows the green beam B1 (referring to FIG. 2B) to pass through and filters out beams of the remaining color. The third light filtering region R104C is provided with a blue filter which allows the blue beam (e.g., the excitation beam B of FIG. 2A) to pass through and filters out beams of the remaining color; alternatively, the third light filtering region R104C is not provided with any filter.

The wavelength conversion module 103 and the light filtering module 104 rotate synchronously. Specifically, referring to FIG. 2A, in the first time segment, the non-light conversion region R2 of the wavelength conversion module 103 cuts into the transmission path of the excitation beam B transmitted from the beam combining component 101A, and the third light filtering region R104C of the light filtering module 104 cuts into the transmission path of the excitation beam B transmitted from the beam combining component 101A. The excitation beam B transmitted from the excitation light source 100 sequentially passes through the beam combining component 101A and the non-light conversion region R2 of the wavelength conversion module 103, is then sequentially reflected by the reflection component 105, the reflection component 106, and the reflection component 107, and then passes through the beam combining component 101A again. The excitation beam B that passes through the beam combining component 101A again then passes through the third light filtering region R104C of the light filtering module 104 and is output from the illumination system 10A. In other words, in the first time segment, the illumination system 10A outputs the excitation beam B (e.g., a blue beam).

Referring to FIG. 2B, in the second time segment, the light conversion region R1 of the wavelength conversion module 103 cuts into the transmission path of the excitation beam B transmitted from the beam combining component 101A, and the second light filtering region R104B of the light filtering module 104 cuts into the transmission path of the conversion beam BC transmitted from the beam combining component 101A. The excitation beam B transmitted from the excitation light source 100 passes through the beam combining component 101A and is then transmitted to the light conversion region R1 of the wavelength conversion module 103. The light conversion region R1 converts the excitation beam B into the conversion beam BC (e.g., a yellow beam) and reflects the conversion beam BC back to the beam combining component 101A. The beam combining component 101A reflects the conversion beam BC. The conversion beam BC reflected by the beam combining component 101A is transmitted to the second light filtering region R104B of the light filtering module 104. The second light filtering region R104B allows the green beam B1 in the conversion beam BC to pass through and filters out beams of the remaining color. In other words, in the second time segment, the illumination system 10A outputs the green beam B1.

Referring to FIG. 2C, in the third time segment, the light conversion region R1 of the wavelength conversion module 103 cuts into the transmission path of the excitation beam B transmitted from the beam combining component 101A, and the first light filtering region R104A of the light filtering module 104 cuts into the transmission path of the conversion beam BC transmitted from the beam combining component 101A. In FIG. 2C, reference may be made to the description of FIG. 2B for the transmission paths of the excitation beam B and the conversion beam BC, which shall not be repeatedly described here. FIG. 2C differs from FIG. 2B in that, in the third time segment, the first light filtering region R104A of the light filtering module 104 cuts into the transmission path of the conversion beam BC from the beam combining component 101A, and the first light filtering region R104A allows the red beam B2 in the conversion beam BC to pass through and filters out beams of the remaining color. In other words, in the third time segment, the illumination system 10A outputs the red beam B2.

According to different requirements, the illumination system 10A may further include other components. For example, the illumination system 10A may further include a plurality of lens components (not shown). The plurality of lens components may be disposed between any two components of the illumination system 10A to provide effects such as converging beams or collimating beams. Moreover, the illumination system 10A may further include a light homogenization component (not shown) such as a light integration rod, but the invention is not limited thereto.

Figure 5A:
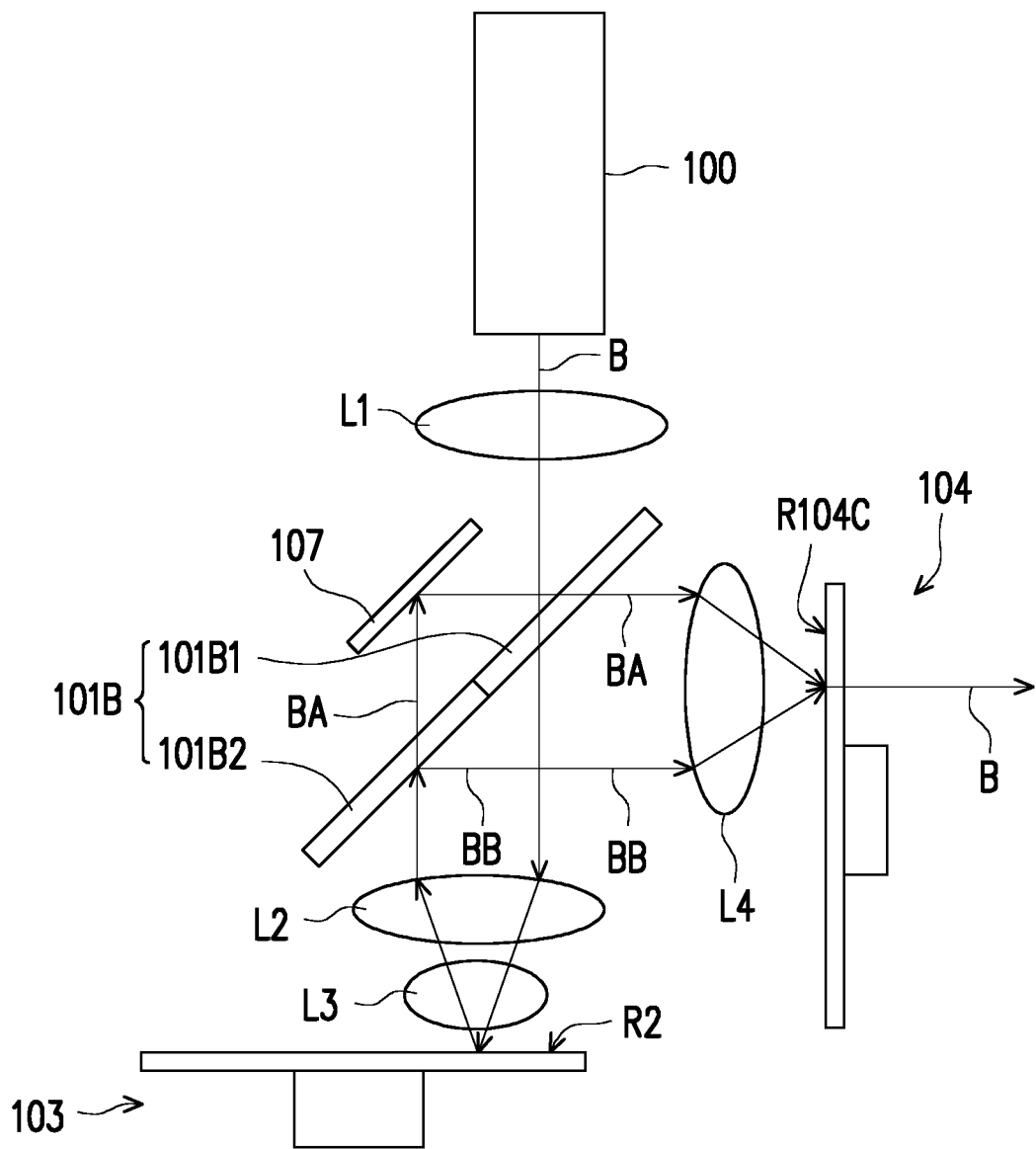
FIG. 5A to FIG. 5C are respectively schematic views of another embodiment of the illumination system in FIG. 1 in different time segments.
Figure 5B:
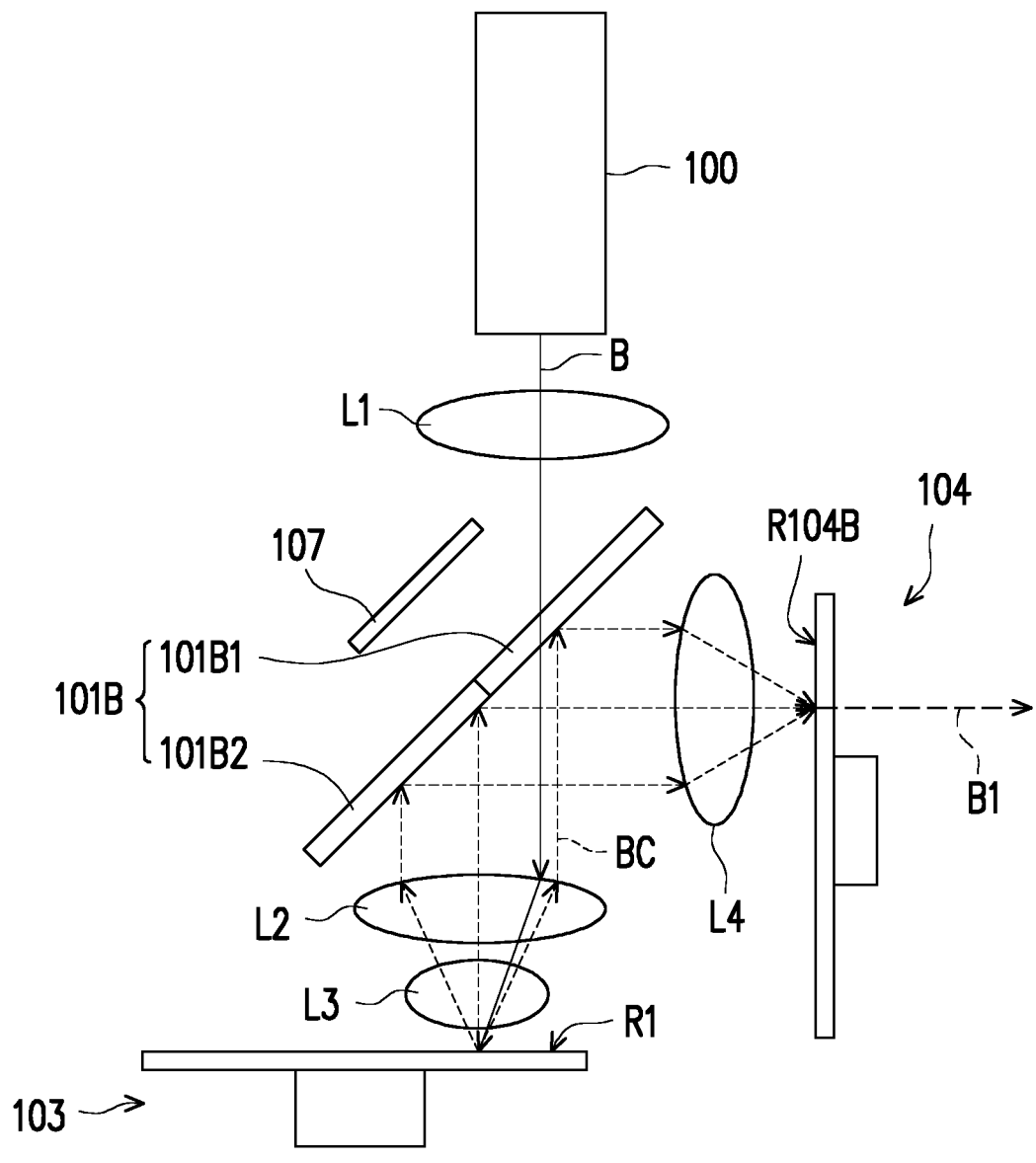
Figure 5C:
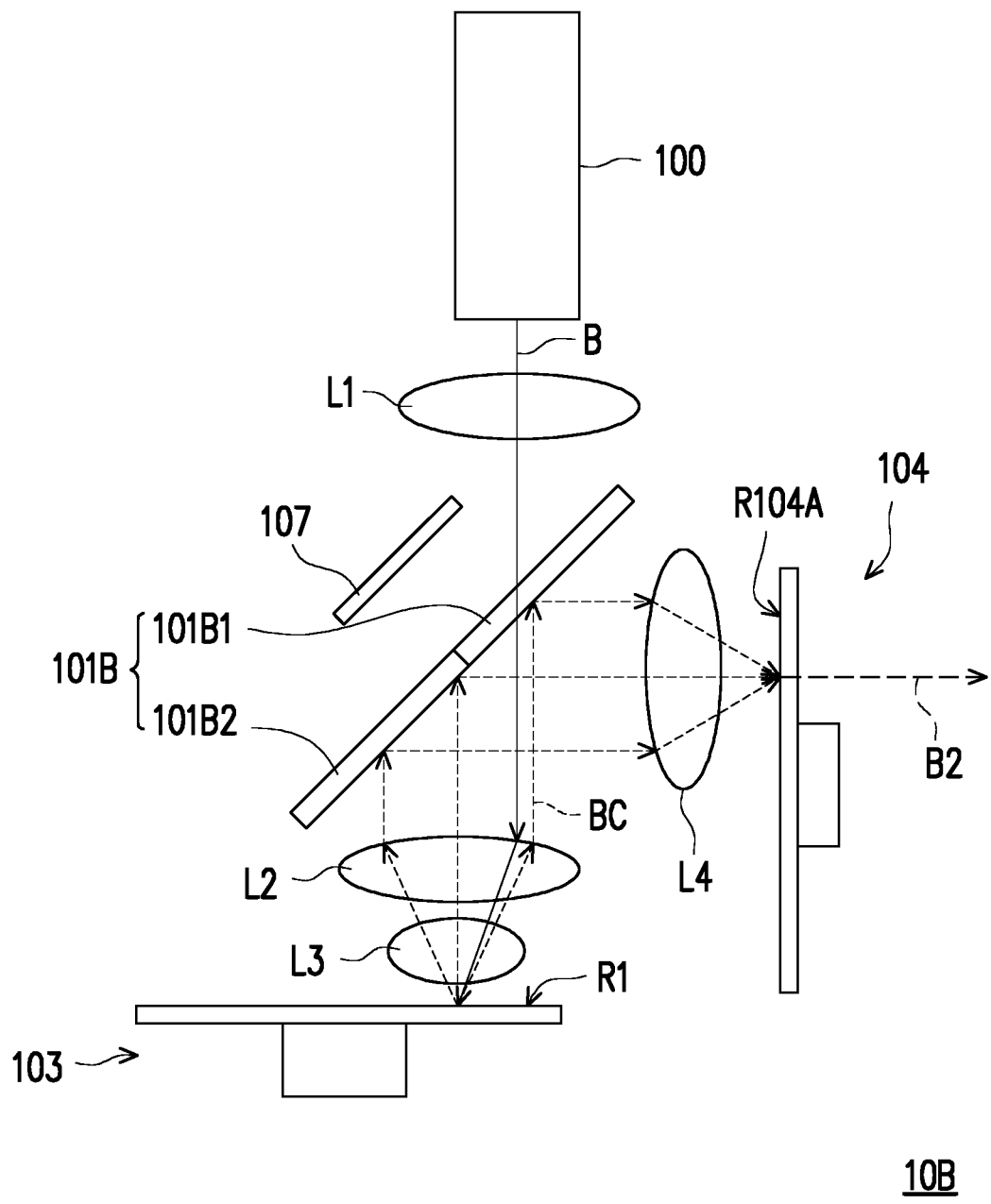

FIG. 5A to FIG. 5C are respectively schematic views of another embodiment of the illumination system 10 in FIG. 1 in different time segments. Referring to FIG. 5A to FIG. 5C, the differences between an illumination system 10B and the illumination system 10A of FIG. 2A to FIG. 2C will be described below.

In addition to including a beam combining component 101B, the wavelength conversion module 103, the light filtering module 104, and the reflection component 107, the illumination system 10B further includes a lens component L1, a lens component L2, a lens component L3, and a lens component L4, but the illumination system 10B does not include the reflection component 105 and the reflection component 106 in FIG. 2A to FIG. 2C. The lens component L1 is disposed on the transmission path of the excitation beam B transmitted from the excitation light source 100 and located between the beam combining component 101B and the excitation light source 100. The lens component L2 and the lens component L3 are sequentially disposed on the transmission path of the excitation beam B transmitted from the beam combining component 101B and located between the wavelength conversion module 103 and the beam combining component 101B. The lens component L4 is disposed on the transmission path of the excitation beam B and the conversion beam BC transmitted from the beam combining component 101B and located between the light filtering module 104 and the beam combining component 101B.

In the illumination system 10B, the non-light conversion region R2 also reflects the excitation beam B. In such a framework, if the carrier board 1030 (referring to FIG. 3) of the wavelength conversion module 103 is a metal carrier board, it is not required to form an opening in the non-light conversion region R2 of the metal carrier board. On the other hand, if the carrier board 1030 (referring to FIG. 3) is a light transmissive carrier board having a reflective layer formed thereon, the reflective layer is also located in the non-light conversion region R2.

The beam combining component 101B includes a first portion 101B1 and a second portion 101B2 connected to the first portion 101B1. The first portion 101B1 is disposed on the transmission path of the excitation beam B transmitted from the lens component L1 and the transmission path of the conversion beam BC transmitted from the lens component L2, and the first portion 101B1 is located between the lens component L2 and the lens component L1. The first portion 101B1 allows the excitation beam B to pass through and reflects the conversion beam BC. The second portion 101B2 is disposed on the transmission path of the excitation beam B and the conversion beam BC transmitted from the lens component L2, and the second portion 101B2 is located between the lens component L2 and the reflection component 107. The second portion 101B2 reflects the conversion beam BC, allows a first sub-beam BA of the excitation beam B to pass through, and reflects a second sub-beam BB of the excitation beam B. The reflection component 107 is disposed on the transmission path of the first sub-beam BA passing through the second portion 101B2 and reflects the first sub-beam BA to the first portion 101B1.

Referring to FIG. 5A, in the first time segment, the non-light conversion region R2 of the wavelength conversion module 103 cuts into the transmission path of the excitation beam B transmitted from the lens component L3, and the third light filtering region R104C of the light filtering module 104 cuts into the transmission path of the first sub-beam BA and the second sub-beam BB transmitted from the lens component L4. The excitation beam B transmitted from the excitation light source 100 sequentially passes through the lens component L1, the first portion 101B1 of the beam combining component 101B, the lens component L2, and the lens component L3, and is then reflected by the non-light conversion region R2 of the wavelength conversion module 103. The excitation beam B reflected by the non-light conversion region R2 sequentially passes through the lens component L3 and the lens component L2 and is then transmitted to the second portion 101B2 of the beam combining component 101B. The first sub-beam BA of the excitation beam B passes through the second portion 101B2, is then reflected by the reflection component 107, then sequentially passes through the first portion 101B1, the lens component L4, and the third light filtering region R104C of the light filtering module 104, and is output from the illumination system 10B. The second sub-beam BB of the excitation beam B is reflected by the second portion 101B2, then sequentially passes through the lens component L4 and the third light filtering region R104C of the light filtering module 104, and is output from the illumination system 10B. In other words, in the first time segment, the illumination system 10B outputs the excitation beam B (e.g., the blue beam B).

Referring to FIG. 5B, in the second time segment, the light conversion region R1 of the wavelength conversion module 103 cuts into the transmission path of the excitation beam B transmitted from the lens component L3, and the second light filtering region R104B of the light filtering module 104 cuts into the transmission path of the conversion beam BC transmitted from the lens component L4. In FIG. 5B, reference may be made to the description of FIG. 5A for the transmission path of the excitation beam B from the excitation light source 100 to the light conversion region R1 of the wavelength conversion module 103, which shall not be repeatedly described here. The light conversion region R1 of the wavelength conversion module 103 converts the excitation beam B into the conversion beam BC and reflects the conversion beam BC. The conversion beam BC reflected by the light conversion region R1 sequentially passes through the lens component L3 and the lens component L2, is then reflected by the first portion 101B1 and/or the second portion 101B2 of the beam combining component 101B, and then passes through the lens component L4 and is transmitted to the second light filtering region R104B of the light filtering module 104. The second light filtering region R104B allows the green beam B1 in the conversion beam BC to pass through and filters out beams of the remaining color. In other words, in the second time segment, the illumination system 10B outputs the green beam B1.

Referring to FIG. 5C, in the third time segment, the light conversion region R1 of the wavelength conversion module 103 cuts into the transmission path of the excitation beam B transmitted from the lens component L3, and the first light filtering region R104A of the light filtering module 104 cuts into the transmission path of the conversion beam BC transmitted from the lens component L4. In FIG. 5C, reference may be made to the description of FIG. 5B for the transmission path of the excitation beam B and the conversion beam BC, which shall not be repeatedly described here. The difference between FIG. 5C and FIG. 5B lies in that, in the third time segment, the first light filtering region R104A of the light filtering module 104 cuts into the transmission path of the conversion beam BC transmitted from the beam combining component 101B, and the first light filtering region R104A allows the red beam B2 in the conversion beam BC to pass through and filters out beams of the remaining color. In other words, in the third time segment, the illumination system 10B outputs the red beam B2.

According to different requirements, the illumination system 10B may further include other components. For example, the illumination system 10B may further include other lens components (not shown). Moreover, the illumination system 10B may further include a light homogenization component (not shown) such as a light integration rod, but the invention is not limited thereto.

Figure 6A:
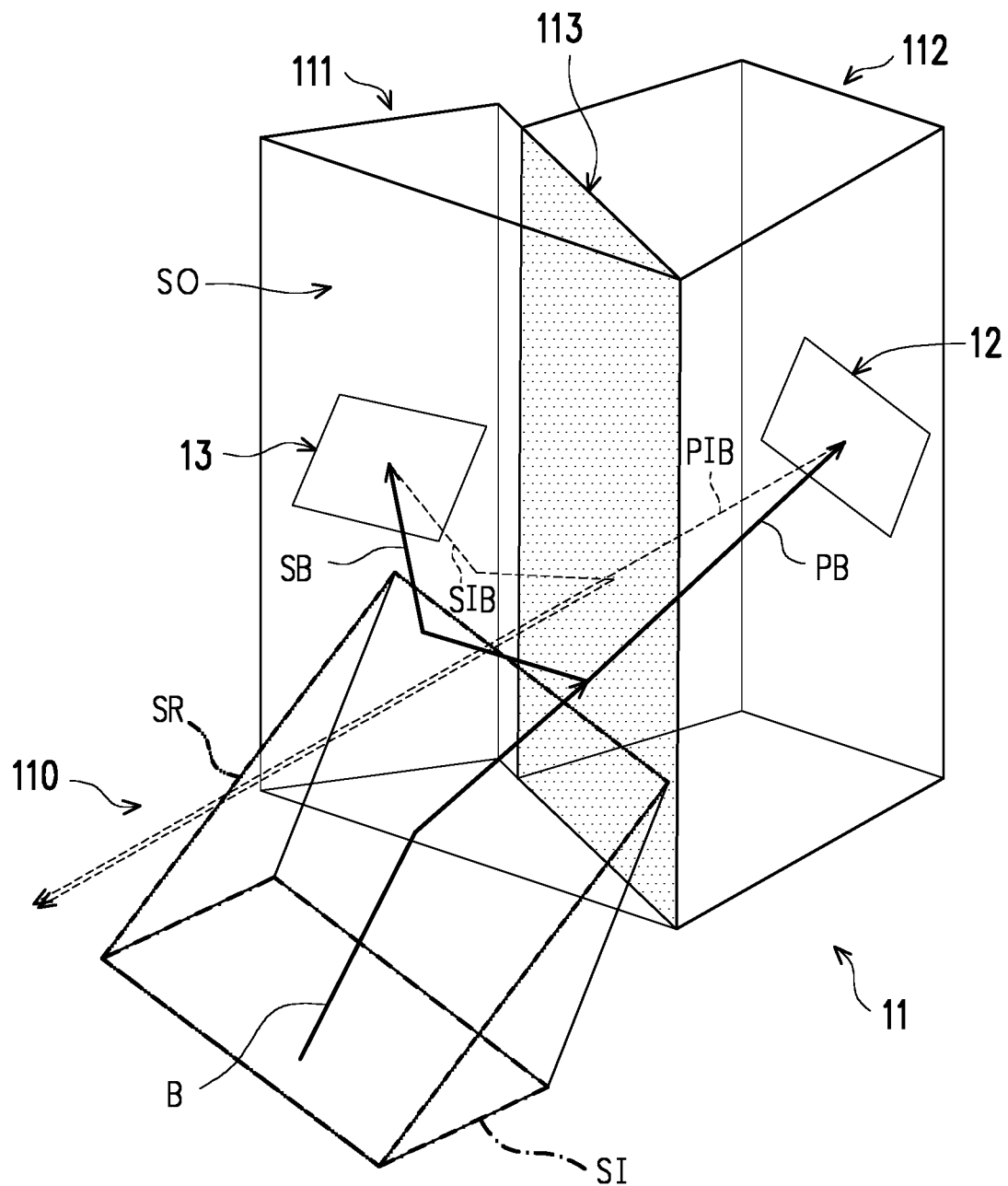
FIG. 6A and FIG. 6B are respectively schematic views of an embodiment of the polarization beam splitting component in FIG. 1 viewed from different angles.
Figure 6B:
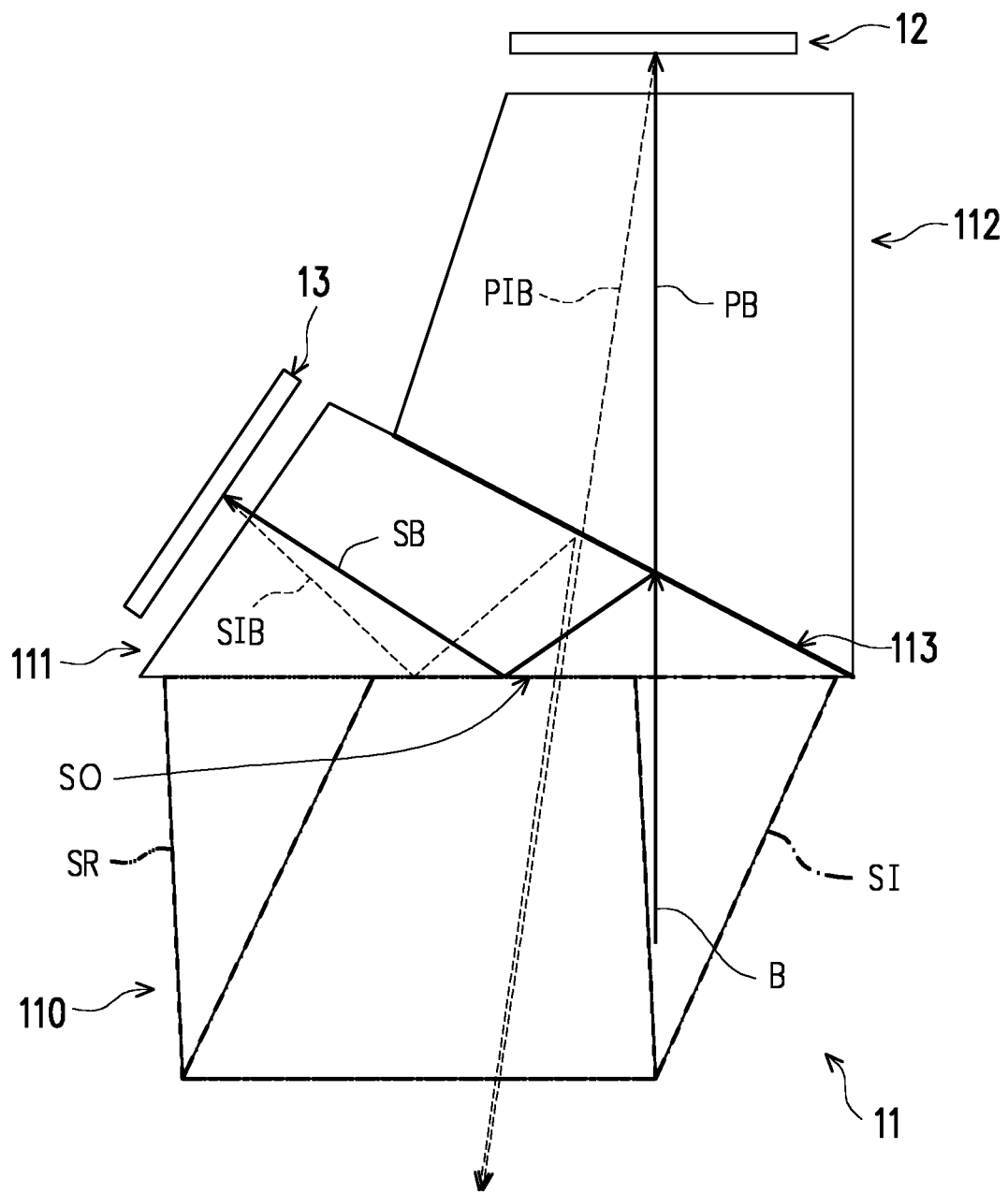

FIG. 6A and FIG. 6B are respectively schematic views of an embodiment of the polarization beam splitting component 11 in FIG. 1 viewed from different angles, and FIG. 6A and FIG. 6B also schematically show the first light valve 12 and the second light valve 13 in FIG. 1.

Referring to FIG. 6A and FIG. 6B, the polarization beam splitting component 11 includes a first prism 110, a second prism 111, a third prism 112, and a polarization beam splitting-combining layer 113. The second prism 111 is disposed between the first prism 110 and the third prism 112. The polarization beam splitting-combining layer 113 (indicated as dots in FIG. 6A; indicated by thick solid lines in FIG. 6B) is disposed between the second prism 111 and the third prism 112. Each color beam among the beams of multiple colors (FIG. 6A and FIG. 6B only schematically show the excitation beam B) is transmitted to the polarization beam splitting-combining layer 113 via the first prism 110 and the second prism 111. The polarization beam splitting-combining layer 113 allows the first polarization beam (e.g., the first polarization beam PB) and the first image beam (e.g., the first image beam PIB) to pass through and reflects the second polarization beam (e.g., the second polarization beam SB) and the second image beam (e.g., the second image beam SIB). The first image beam and the second image beam are combined together by the polarization beam splitting-combining layer 113, and the first image beam and the second image beam which are combined are transmitted to the projection lens (not shown in FIG. 6A and FIG. 6B; referring to the projection lens 14 of FIG. 1) via the second prism 111. In FIG. 6A and FIG. 6B, the first image beam PIB and the second image beam SIB which are combined are shown as slightly separated in order to clearly illustrate the transmission path of each image beam. However, the first image beam PIB and the second image beam SIB which are combined are actually transmitted to the projection lens along the same or substantially the same transmission path.

In the embodiment, the first prism 110 and the second prism 111 are both triangular prisms. The third prism 112 is a quadrangular prism. Further, the first light valve 12 and the polarization beam splitting-combining layer 113 are respectively disposed on two opposite sides of the third prism 112. The second light valve 13, the first prism 110, and the polarization beam splitting-combining layer 113 are respectively disposed on three adjacent sides of the second prism 111.

In the first time segment, after entering the first prism 110 from a light incident surface SI (indicated by dot-dashed lines) of the first prism 110, the excitation beam B is reflected by a reflection surface SR (indicated by double-dot-dashed lines) of the first prism 110, enters the second prism 111, and is transmitted to the polarization beam splitting-combining layer 113. The polarization beam splitting-combining layer 113 allows the first polarization beam PB in the excitation beam B to pass through and reflects the second polarization beam SB. The first polarization beam PB passing through the polarization beam splitting-combining layer 113 passes through the third prism 112 and is transmitted to the first light valve 12. The first light valve 12 converts the first polarization beam PB into the first image beam PIB and reflects the first image beam PIB. The first image beam PIB reflected by the first light valve 12 sequentially passes through the third prism 112 and the polarization beam splitting-combining layer 113, and is then directly emitted from a light exit surface SO of the second prism 111. The second polarization beam SB reflected by the polarization beam splitting-combining layer 113 is reflected by the light exit surface SO of the second prism 111 and transmitted to the second light valve 13. The second light valve 13 converts the second polarization beam SB into the second image beam SIB and reflects the second image beam SIB. After entering the second prism 111, the second image beam SIB reflected by the second light valve 13 is sequentially reflected by the light exit surface SO of the second prism 111 and the polarization beam splitting-combining layer 113, and is then emitted from the light exit surface SO of the second prism 111. In other words, the second polarization beam SB and the second image beam SIB do not enter the third prism 112; namely, the third prism 112 is located outside the transmission paths of the second polarization beam SB and the second image beam SIB.

In the second time segment (or the third time segment), reference may be made to the above description for the transmission path of the green beam B1 (or the red beam B2) shown in FIG. 1, which shall not be repeatedly described here.

The polarization beam splitting component 11 is used to split each color beam among the beams of multiple colors into two illumination beams having polarization states perpendicular to each other, such that the illumination beams received by two light valves (e.g., the first light valve 12 and the second light valve 13) in the same time segment have the same color. In addition, the two illumination beams having the same color are respectively converted into image beams having the same color by the two light valves, and the image beams having the same color are then transmitted to the projection lens 14 (referring to FIG. 1) and output from the projection device 1. Therefore, the brightness of the image beam of each color output from the projection device 1 is not confined by the upper limit of the tolerance brightness of one single light valve but is the sum of the brightness of the image beams from the two light valves. Accordingly, the projection device 1 of the present embodiment can exhibit an ideal brightness.

Figure 7:
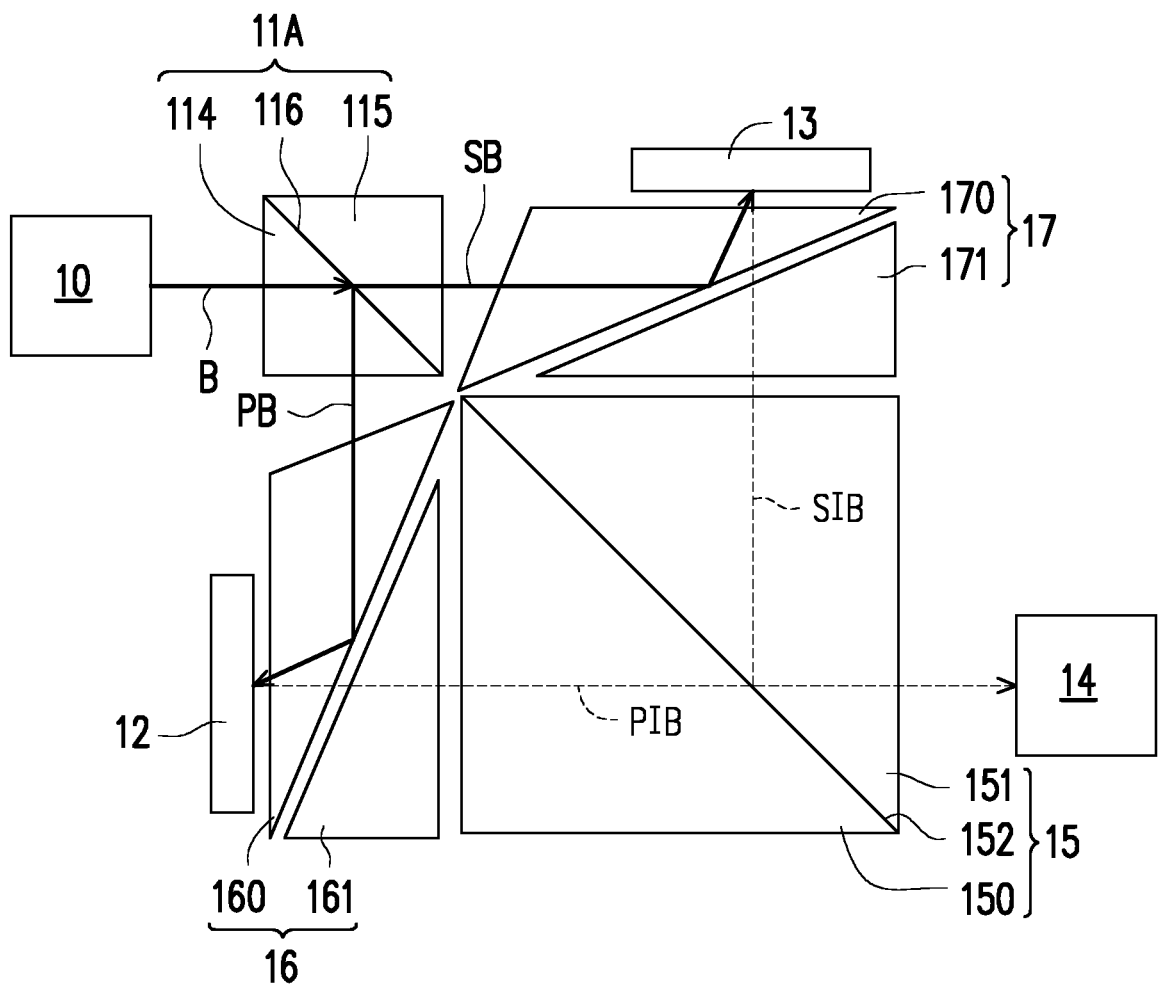
FIG. 7 is a schematic view of another embodiment of the projection device of the invention.

In the above embodiment, the splitting of the illumination beam and the combination of the image beams are both performed by the polarization beam splitting component 11, but the invention is not limited thereto. FIG. 7 is a schematic view of another embodiment of the projection device of the invention. In FIG. 7, the beams of multiple colors are transmitted to the projection lens along the same transmission path; therefore, FIG. 7 only schematically shows the transmission path of the excitation beam B (e.g., a blue beam).

Referring to FIG. 7, the differences between a projection device 1A and the projection device 1 of FIG. 1 will be described below. In addition to the illumination system 10, a polarization beam splitting component 11A, the first light valve 12, the second light valve 13, and the projection lens 14, the projection device 1A further includes a polarization beam combining component 15, a first light transmission component 16, and a second light transmission component 17.

The polarization beam combining component 15 is disposed on the transmission paths of the first image beam PIB and the second image beam SIB, and the first image beam PIB and the second image beam SIB are combined together by the polarization beam combining component 15. The first image beam PIB and the second image beam SIB which are combined are transmitted to the projection lens 14 via the polarization beam combining component 15. In the embodiment, the polarization beam splitting component 11A and the polarization beam combining component 15 each include two triangular prisms and a polarization beam splitting-combining layer disposed between the two triangular prisms. As shown in FIG. 7, the polarization beam splitting component 11A includes a triangular prism 114, a triangular prism 115, and a polarization beam splitting-combining layer 116 disposed between the triangular prism 114 and the triangular prism 115. The polarization beam combining component 15 includes a triangular prism 150, a triangular prism 151, and a polarization beam splitting-combining layer 152 disposed between the triangular prism 150 and the triangular prism 151.

In the embodiment, the polarization beam splitting component 11A reflects the first polarization beam PB and allows the second polarization beam SB to pass through, and the polarization beam combining component 15 allows the first image beam PIB to pass through and reflects the second image beam SIB, but the invention is not limited thereto. In another embodiment, the polarization beam splitting component 11A reflects the first polarization beam PB and allows the second polarization beam SB to pass through, and the polarization beam combining component 15 reflects the first image beam PIB and allows the second image beam SIB to pass through. In this case, the projection lens 14 is disposed at a position close to the triangular prism 150.

The first light transmission component 16 is disposed on the transmission path of the first polarization beam PB transmitted from the polarization beam splitting component 11A and the transmission path of the first image beam PIB transmitted from the first light valve 12. The first polarization beam PB transmitted from the polarization beam splitting component 11A is transmitted to the first light valve 12 via the first light transmission component 16, and the first image beam PIB transmitted from the first light valve 12 is transmitted to the polarization beam combining component 15 via the first light transmission component 16.

The second light transmission component 17 is disposed on the transmission path of the second polarization beam SB transmitted from the polarization beam splitting component 11A and the transmission path of the second image beam SIB transmitted from the second light valve 13. The second polarization beam SB transmitted from the polarization beam splitting component 11A is transmitted to the second light valve 13 via the second light transmission component 17, and the second image beam SIB transmitted from the second light valve 13 is transmitted to the polarization beam combining component 15 via the second light transmission component 17.

In the embodiment, the first light transmission component 16 and the second light transmission component 17 each include two triangular prisms. As shown in FIG. 7, the first light transmission component 16 includes a triangular prism 160 and a triangular prism 161, and the second light transmission component 17 includes a triangular prism 170 and a triangular prism 171. However, the types of components and the number of components included in each of the first light transmission component 16 and the second light transmission component 17 may be changed according to the requirement and are not limited to those shown in FIG. 7.

In the first time segment, the excitation beam B passes through the triangular prism 114 of the polarization beam splitting component 11A and is transmitted to the polarization beam splitting-combining layer 116. The polarization beam splitting-combining layer 116 reflects the first polarization beam PB and allows the second polarization beam SB to pass through. The first polarization beam PB reflected by the polarization beam splitting-combining layer 116 is then reflected by the triangular prism 160 to the first light valve 12. The first light valve 12 converts the first polarization beam PB into the first image beam PIB and reflects the first image beam PIB. The first image beam PIB reflected by the first light valve 12 sequentially passes through the triangular prism 160, the triangular prism 161, the triangular prism 150, the polarization beam splitting-combining layer 152, and the triangular prism 151, and is then transmitted to the projection lens 14. The second polarization beam SB passing through the polarization beam splitting-combining layer 116 passes through the triangular prism 115 and is then reflected by the triangular prism 170 to the second light valve 13. The second light valve 13 converts the second polarization beam SB into the second image beam SIB and reflects the second image beam SIB. The second image beam SIB reflected by the second light valve 13 sequentially passes through the triangular prism 170, the triangular prism 171, and the triangular prism 151, and is then reflected by the polarization beam splitting-combining layer 152 to the projection lens 14.

In the second time segment (or the third time segment), reference may be made to the above description for the transmission path of the green beam B1 (or the red beam B2) shown in FIG. 1, which shall not be repeatedly described here.

In summary of the above, the embodiments of the invention exhibit at least one of the following advantages or effects. In the embodiments of the invention, the polarization beam splitting component is used to split each color beam among the beams of multiple colors into two illumination beams having polarization states perpendicular to each other, such that the illumination beams received by two light valves in the same time segment have the same color. In addition, the two illumination beams having the same color are respectively converted into image beams having the same color by the two light valves, and the image beams having the same color are then transmitted to the projection lens and output from the projection device. Therefore, the brightness of the image beam of each color output from the projection device is not confined by the upper limit of the tolerance brightness of one single light valve, and the projection device can exhibit an ideal brightness. In an embodiment, the polarization beam splitting component is further adapted to combine image beams having the same color. In another embodiment, the projection device may further include a polarization beam splitting component to combine image beams having the same color.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device comprising:
an illumination system outputting beams of multiple colors in time sequence;
a polarization beam splitting component disposed on a transmission path of the beams of multiple colors transmitted from the illumination system, wherein the polarization beam splitting component splits each color beam among the beams of multiple colors into a first polarization beam and a second polarization beam, and the first polarization beam and the second polarization beam have polarization states perpendicular to each other;
a first light valve disposed on a transmission path of the first polarization beam and converts the first polarization beam into a first image beam;
a second light valve disposed on a transmission path of the second polarization beam and converts the second polarization beam into a second image beam; and
a projection lens disposed on transmission paths of the first image beam and the second image beam,
wherein the first image beam and the second image beam are combined together by the polarization beam splitting component, and the first image beam and the second image beam which are combined are transmitted to the projection lens via the polarization beam splitting component, and wherein the polarization beam splitting component comprises a first prism, a second prism, a third prism, and a polarization beam splitting-combining layer, wherein the second prism is disposed between the first prism and the third prism, the polarization beam splitting-combining layer is disposed between the second prism and the third prism, each color beam among the beams of multiple colors is transmitted to the polarization beam splitting-combining layer via the first prism and the second prism, the polarization beam splitting-combining layer allows the first polarization beam and the first image beam to pass through and reflects the second polarization beam and the second image beam, the first image beam and the second image beam are combined together by the polarization beam splitting-combining layer, and the first image beam and the second image beam which are combined are transmitted to the projection lens via the second prism.

2. The projection device according to claim 1, wherein the third prism is located outside transmission paths of the second polarization beam and the second image beam.

3. The projection device according to claim 1, wherein the first prism and the second prism are both triangular prisms, and the third prism is a quadrangular prism, wherein the first light valve and the polarization beam splitting-combining layer are respectively disposed on two opposite sides of the third prism, and the second light valve, the first prism, and the polarization beam splitting-combining layer are respectively disposed on three adjacent sides of the second prism.

4. A projection device comprising:
an illumination system outputting beams of multiple colors in time sequence;
a polarization beam splitting component disposed on a transmission path of the beams of multiple colors transmitted from the illumination system, wherein the polarization beam splitting component splits each color beam among the beams of multiple colors into a first polarization beam and a second polarization beam, and the first polarization beam and the second polarization beam have polarization states perpendicular to each other;
a first light valve disposed on a transmission path of the first polarization beam and converts the first polarization beam into a first image beam;
a second light valve disposed on a transmission path of the second polarization beam and converts the second polarization beam into a second image beam;
a projection lens disposed on transmission paths of the first image beam and the second image beam; and
a polarization beam combining component disposed on transmission paths of the first image beam and the second image beam, wherein the first image beam and the second image beam are combined together by the polarization beam combining component, and the first image beam and the second image beam which are combined are transmitted to the projection lens via the polarization beam combining component.

5. The projection device according to claim 4, wherein the polarization beam splitting component reflects the first polarization beam and allows the second polarization beam to pass through, and the polarization beam combining component allows the first image beam to pass through and reflects the second image beam.

6. The projection device according to claim 4, wherein the polarization beam splitting component reflects the first polarization beam and allows the second polarization beam to pass through, and the polarization beam combining component reflects the first image beam and allows the second image beam to pass through.

7. The projection device according to claim 4, wherein the polarization beam splitting component and the polarization beam combining component each comprise two triangular prisms and a polarization beam splitting-combining layer disposed between the two triangular prisms.

8. The projection device according to claim 4, further comprising:
a first light transmission component, wherein the first polarization beam transmitted from the polarization beam splitting component is transmitted to the first light valve via the first light transmission component, and the first image beam transmitted from the first light valve is transmitted to the polarization beam combining component via the first light transmission component; and
a second light transmission component, wherein the second polarization beam transmitted from the polarization beam splitting component is transmitted to the second light valve via the second light transmission component, and the second image beam transmitted from the second light valve is transmitted to the polarization beam combining component via the second light transmission component.

9. A projection device comprising:
an illumination system outputting beams of multiple colors in time sequence;
a polarization beam splitting component disposed on a transmission path of the beams of multiple colors transmitted from the illumination system, wherein the polarization beam splitting component splits each color beam among the beams of multiple colors into a first polarization beam and a second polarization beam, and the first polarization beam and the second polarization beam have polarization states perpendicular to each other;
a first light valve disposed on a transmission path of the first polarization beam and converts the first polarization beam into a first image beam;
a second light valve disposed on a transmission path of the second polarization beam and converts the second polarization beam into a second image beam;
a projection lens disposed on transmission paths of the first image beam and the second image beam,
wherein the illumination system comprises:
an excitation light source outputting an excitation beam;
a beam combining component disposed on a transmission path of the excitation beam transmitted from the excitation light source;
a wavelength conversion module disposed on a transmission path of the excitation beam transmitted from the beam combining component, wherein the wavelength conversion module has a light conversion region and a non-light conversion region, the light conversion region and the non-light conversion region alternately cut into the transmission path of the excitation beam transmitted from the beam combining component, the light conversion region converts the excitation beam into a conversion beam, and the beam combining component is further disposed on transmission paths of the conversion beam and the excitation beam transmitted from the wavelength conversion module; and a light filtering module disposed on transmission paths of the conversion beam and the excitation beam transmitted from the beam combining component, wherein the wavelength conversion module and the light filtering module rotate synchronously.

10. The projection device according to claim 9, wherein the beam combining component allows the excitation beam to pass through and reflects the conversion beam, the light conversion region reflects the conversion beam back to the beam combining component, the non-light conversion region allows the excitation beam to pass through, and the illumination system further comprises:

a plurality of reflection components disposed on a transmission path of the excitation beam passing through the non-light conversion region and transmitting the excitation beam passing through the non-light conversion region back to the beam combining component.

11. The projection device according to claim 9, wherein the light conversion region and the non-light conversion region respectively reflect the conversion beam and the excitation beam back to the beam combining component, the beam combining component comprises a first portion and a second portion connected to the first portion, the first portion allows the excitation beam to pass through and reflects the conversion beam, the second portion reflects the conversion beam, allows a first sub-beam of the excitation beam to pass through, and reflects a second sub-beam of the excitation beam, and the illumination system further comprises:

a reflection component disposed on a transmission path of the first sub-beam passing through the second portion and reflecting the first sub-beam to the first portion.

\* \* \* \* \*